(12) United States Patent
Qin et al.

(10) Patent No.: US 10,867,207 B2
(45) Date of Patent: Dec. 15, 2020

(54) DETECTION METHOD, DEVICE, APPARATUS AND COMPUTER STORAGE MEDIUM

(71) Applicant: CHENGDU ZHONGXIN HUARUI TECHNOLOGY CO., LTD., Sichuan (CN)

(72) Inventors: Jun Qin, Sichuan (CN); Yue Qin, Sichuan (CN)

(73) Assignee: CHENGDU ZHONGXIN HUARUI TECHNOLOGY CO., LTD., Chengdu (CN)

(*) Notice: Subject to any disclaimer, the term of this patent is extended or adjusted under 35 U.S.C. 154(b) by 0 days.

(21) Appl. No.: 16/521,532

(22) Filed: Jul. 24, 2019

(65) Prior Publication Data

US 2019/0347514 A1 Nov. 14, 2019

Related U.S. Application Data

(63) Continuation of application No. PCT/CN2018/080324, filed on Mar. 23, 2018.

(30) Foreign Application Priority Data

Jan. 25, 2017 (CN) .......................... 2017 1 0062783

(51) Int. Cl.
*G06K 9/00* (2006.01)
*G06K 9/62* (2006.01)
(Continued)

(52) U.S. Cl.
CPC ........... *G06K 9/6215* (2013.01); *G01N 21/27* (2013.01); *G06K 9/00214* (2013.01); *G06K 9/4661* (2013.01); *G06K 2009/4657* (2013.01)

(58) Field of Classification Search
CPC ............. G01N 21/359; G01N 21/3563; G01N 2201/129; A61B 5/445; A61B 5/0059;
(Continued)

(56) References Cited

U.S. PATENT DOCUMENTS

| 2009/0180689 A1* | 7/2009 | Komiya ................. H04N 1/603 382/167 |
| 2013/0250301 A1 | 9/2013 | Feitisch |
| 2016/0025569 A1 | 1/2016 | Hargreaves et al. |

FOREIGN PATENT DOCUMENTS

| CN | 104380085 A | 2/2015 |
| CN | 106170824 A | 11/2016 |

(Continued)

*Primary Examiner* — Charlotte M Baker
(74) *Attorney, Agent, or Firm* — Wayne & Ken, LLC; Tony Hom

(57) ABSTRACT

The present application relates to a detection method, belonging to the technical field of anti-fake detection. The detection method comprises steps of: acquiring reference imaging spectral data and imaging spectral data of a surface of an object to be detected; obtaining spectral reflectance of the surface of the object to be detected according to the reference imaging spectral data and the imaging spectral data of the surface of the object to be detected; matching the spectral reflectance of the object to be detected with spectral reflectance, stored in a calibration library, of an original object corresponding to the object to be detected; determining that the object to be detected is consistent with the original object if the matching of spectral reflectance is successful; and determining that the object to be detected is not consistent with the original object if the matching of spectral reflectance is failed.

17 Claims, 11 Drawing Sheets

(51) Int. Cl.
*G01N 21/27* (2006.01)
*G06K 9/46* (2006.01)

(58) Field of Classification Search
CPC ........ A61B 2034/2065; G06K 2209/21; G08B 13/19613
USPC .................................................. 382/103, 167
See application file for complete search history.

(56) References Cited

FOREIGN PATENT DOCUMENTS

| CN | 106290238 A | 1/2017 |
|----|-------------|--------|
| CN | 106841035 A | 6/2017 |

\* cited by examiner

DETECTION METHOD, DEVICE, APPARATUS AND COMPUTER STORAGE MEDIUM

CROSS-REFERENCE TO RELATED APPLICATIONS

This application is a continuation of International Application No. PCT/CN2018/080324, filed on Mar. 23, 2018, which claims priority to Chinese Patent Application No. 201710062783.X, filed to the CNIPA on Jan. 25, 2017 and entitled "DETECTION METHOD AND DEVICE", the disclosure of which is hereby incorporated by reference in its entirety.

TECHNICAL FIELD

The present application belongs to the technical field of anti-fake detection. Particularly, the present application relates to a detection method, device, apparatus and computer storage medium.

BACKGROUND OF THE PRESENT INVENTION

At present, identification of the authenticity of valuables such as cultural relics and artworks mostly depends upon the memory and professional knowledge of people (experts or someone who is familiar with the valuables). This method is highly subjective. Misjudgment will be caused if people forget some details or people's existing knowledge is incomplete.

In addition, during the current communication and exchange of valuables such as cultural relics and artworks, the color of an object is mostly described in natural languages. For example, in standard references such as Jewelry Identification, adjectives such as light blue and crimson, which are not quantitative characteristics, are mostly used to describe the color, supplemented by color images of the original object captured by a camera, in order to determine whether an object to be identified is the original object or not. However, the color of the object shown in the images and the color of the object perceived by eyes have a characteristic of mesmerism. For example, assuming an object is yellow, the color "yellow" may be the color of yellow light reflected by the object, or may be synthetic yellow from red light and green light reflected by the object. Therefore, color is unable to indicate the uniqueness of an object. That is, it does not mean that an object to be identified is the original object even if they are consistent in color.

Misjudgment of the authenticity of valuables such as cultural relics and artworks will misguide related academic research, and will indirectly influence the academic and economic value of the valuables such as cultural relics and artworks, even destroy the healthy development of the market. Therefore, there is an urgent need to provide a method by which the authenticity of valuables such as cultural relics and artworks can be identified more accurately.

SUMMARY OF THE PRESENT INVENTION

For this purpose, as objectives of the present application, for example, the present application provides a detection method, device, apparatus and computer storage medium, by which the authenticity of valuables such as cultural relics and artworks can be identified more accurately.

In a first aspect, the present application provides a detection method. The method comprises steps of: acquiring reference imaging spectral data and imaging spectral data of a surface of an object to be detected; obtaining spectral reflectance of the surface of the object to be detected according to the reference imaging spectral data and the imaging spectral data of the surface of the object to be detected; matching the spectral reflectance of the object to be detected with spectral reflectance, stored in a calibration library, of an original object corresponding to the object to be detected; determining that the object to be detected is consistent with the original object if the matching of spectral reflectance is successful; and determining that the object to be detected is not consistent with the original object if the matching of spectral reflectance is failed.

Further, before the step of determining that the object to be detected is consistent with the original object if the matching of spectral reflectance is successful, the method further comprises steps of: acquiring three-dimensional spatial morphology information of the object to be detected; three-dimensionally reconstructing the object to be detected according to the three-dimensional spatial morphology information of the object to be detected, to obtain three-dimensional morphology data of the object to be detected; and matching the three-dimensional morphology data of the object to be detected with three-dimensional morphology data, stored in the calibration library, of the original object. Then, the step of determining that the object to be detected is consistent with the original object if the matching of spectral reflectance is successful comprises: determining that the object to be detected is consistent with the original object if both the matching of spectral reflectance and the matching of three-dimensional morphology data are successful.

Further, the step of acquiring three-dimensional spatial morphology information of the object to be detected comprises: acquiring image information in the imaging spectral data of the surface of the object to be detected; and obtaining the three-dimensional spatial morphology information of the object to be detected according to the image information.

Further, the step of acquiring three-dimensional spatial morphology information of the object to be detected comprises: acquiring an image sequence obtained by capturing the object to be detected; and obtaining the three-dimensional spatial morphology information of the object to be detected according to the image sequence.

Further, the step of determining that the object to be detected is not consistent with the original object if the matching of spectral reflectance is failed comprises: determining that the object to be detected is not consistent with the original object if the matching of spectral reflectance or the matching of three-dimensional morphology data is failed.

Further, the step of obtaining spectral reflectance of the surface of the object to be detected according to the reference imaging spectral data and the imaging spectral data of the surface of the object to be detected comprises: obtaining first spectral energy data according to the reference imaging spectral data; obtaining second spectral energy data according to the imaging spectral data of the surface of the object to be detected; and obtaining spectral reflectance of the object to be detected according to the first spectral energy data, the second spectral energy data and a reference reflectance.

Further, the method further comprises: measuring similarity between the spectral reflectance of the object to be detected and the found spectral reflectance of the original object of the object to be detected, to obtain a reflectance similarity factor corresponding to each band; weighted summing reflectance similarity factors of all bands to obtain similarity between the object to be detected and the original object; determining that matching of the spectral reflectance of the object to be detected with the found spectral reflectance of the original object of the object to be detected is successful, if the obtained similarity is greater than or equal to a preset similarity threshold; and determining that matching of the spectral reflectance of the object to be detected with the found spectral reflectance of the original object of the object to be detected is failed, if the obtained similarity is less than the preset similarity threshold.

Further, the method further comprises: acquiring coordinate points of the object to be detected and coordinate points of the original object of the object to be detected, within a preset region; selecting, from the obtained coordinate points, coordinate points whose x-coordinate value and y-coordinate value are both the same, to form a plurality of pairs of coordinate points; acquiring a difference between a z-coordinate value of a coordinate point of the object to be detected and a z-coordinate value of a coordinate point of the original object of the object to be detected, among each of the pairs of coordinate points; calculating a multi-moment function value between all coordinate points and corresponding differences; determining that matching of the three-dimensional morphology data of the object to be detected with the found three-dimensional morphology data of the original object of the object to be detected is successful, if the obtained multi-moment function value is less than a preset threshold; and determining that matching of the three-dimensional morphology data of the object to be detected with the found three-dimensional morphology data of the original object of the object to be detected is failed, if the obtained multi-moment function value is greater than or equal to the preset threshold.

Further, both the reference imaging spectral data and the imaging spectral data of the surface of the object to be detected are obtained under same imaging light conditions.

Further, the imaging spectral data is imaging hyper spectral data.

In a second aspect, the present application provides a detection device, comprising a first acquisition module, a processing module, a first matching module, a first determination module and a second determination module. The first acquisition module is configured to acquire reference imaging spectral data and imaging spectral data of a surface of an object to be detected. The processing module is configured to obtain spectral reflectance of the surface of the object to be detected according to the reference imaging spectral data and the imaging spectral data of the surface of the object to be detected. The first matching module is configured to match the spectral reflectance of the object to be detected with spectral reflectance, stored in a calibration library, of an original object corresponding to the object to be detected. The first determination module is configured to determine that the object to be detected is consistent with the original object if the matching of spectral reflectance is successful. The second determination module is configured to determine that the object to be detected is not consistent with the original object if the matching of spectral reflectance is failed.

Further, the device further comprises a second acquisition module, a three-dimensional reconstruction module and a second matching module. The second acquisition module is configured to acquire three-dimensional spatial morphology information of the object to be detected; the three-dimensional reconstruction module is configured to three-dimensionally reconstruct the object to be detected according to the three-dimensional spatial morphology information of the object to be detected, to obtain three-dimensional morphology data of the object to be detected; and the second matching module is configured to match the three-dimensional morphology data of the object to be detected with three-dimensional morphology data, stored in the calibration library, of the original object. Then, the determination module is specifically configured to determine that the object to be detected is consistent with the original object if both the matching of spectral reflectance and the matching of three-dimensional morphology data are successful, and determine that the object to be detected is not consistent with the original object if the matching of spectral reflectance or the matching of three-dimensional morphology data is failed.

Further, the second acquisition module is configured to: acquire image information in the imaging spectral data of the surface of the object to be detected; and obtain the three-dimensional spatial morphology information of the object to be detected according to the image information.

Further, the second acquisition module is configured to: acquire an image sequence obtained by capturing the object to be detected; and obtain the three-dimensional spatial morphology information of the object to be detected according to the image sequence.

Further, the determination module is configured to determine that the object to be detected is not consistent with the original object if the matching of spectral reflectance or the matching of three-dimensional morphology data is failed.

Further, the processing module comprises: a first processing sub-module, configured to obtain first spectral energy data according to the reference imaging spectral data; a second processing sub-module, configured to obtain second spectral energy data according to the imaging spectral data of the surface of the object to be detected; and a third processing sub-module, configured to obtain spectral reflectance of the object to be detected according to the first spectral energy data, the second spectral energy data and a reference reflectance.

In a third aspect, the present application provides a detection apparatus, comprising a memory and a processor, the memory stores a computer program that can be run on the processor, and the computer program, when executed by the processor, enables the processor to perform steps of the method according to any item of the first aspect.

In a fourth aspect, the present application provides a computer storage medium, which is configured to store computer software instructions used in the method according to any item of the first aspect, or hardware components or combined software and hardware units having the same functions.

Compared with the prior art, by the detection method, device, apparatus and computer storage medium as provided in embodiments of the present application, the uniqueness of an object is represented by the spectral reflectance, and the authenticity of an object is identified by considering the spectral reflectance as the identity information of the object. The spectral reflectance of an object to be detected is matched with spectral reflectance, stored in a calibration library in advance, of the original object. It is indicated that the object to be detected is the original object, that is, the object to be detected is authentic, if the matching of spectral reflectance is successful. It is indicated that the object to be detected is not the original object, that is, the object to be detected is not authentic, if the matching of spectral reflectance is failed. In addition, by obtaining spectral reflectance of the surface of the object to be detected according to the reference imaging spectral data and the imaging spectral data of the surface of the object to be detected, the detection method improves the accuracy of the detection result by effectively eliminating the effect of the change in the external ambient light and the spectral change of the light source in the system on the detection result.

To make the objectives, features and advantages of the present application more apparent and understandable, the present application will be described below in detail by preferred embodiments with reference to the accompanying drawings.

BRIEF DESCRIPTION OF THE DRAWINGS

To describe the technical solutions of the present application more clearly, the drawings to be used in the description of the embodiments will be briefly described below. It should be understood that the drawings described hereinafter show only some embodiments of the present application and thus shall not be considered as any limitation to the scope. A person of ordinary skill in the art can obtain other drawings according to these drawings without paying any creative effort.

DETAILED DESCRIPTION OF THE PRESENT INVENTION

Figure 1:
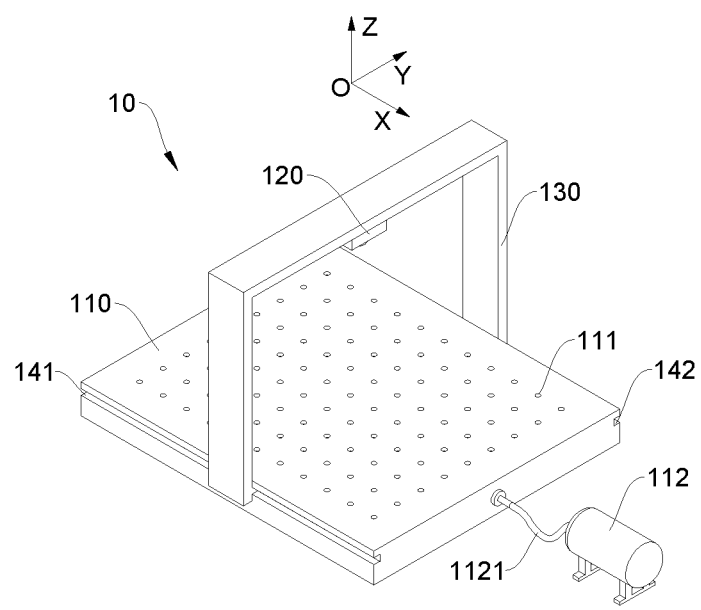
FIG. 1 shows a stereoscopic structure diagram of a detection system according to the present application.

FIG. 1 shows a structure diagram of a detection system that can be applied in the present application. Referring to FIG. 1, the detection system 10 comprises an object carrier 110, a first data collection device 120 and a control device (not shown in FIG. 1).

Figure 2:
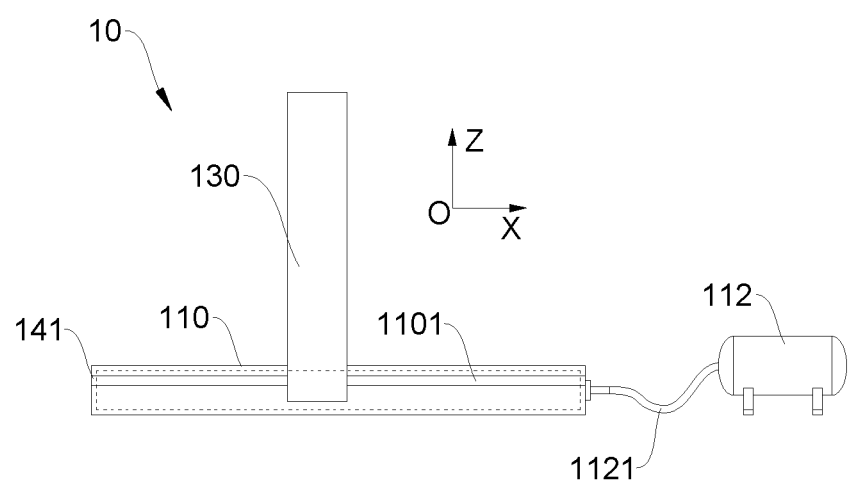
FIG. 2 shows a planar structure diagram of a detection system according to the present application.
Figure 3:
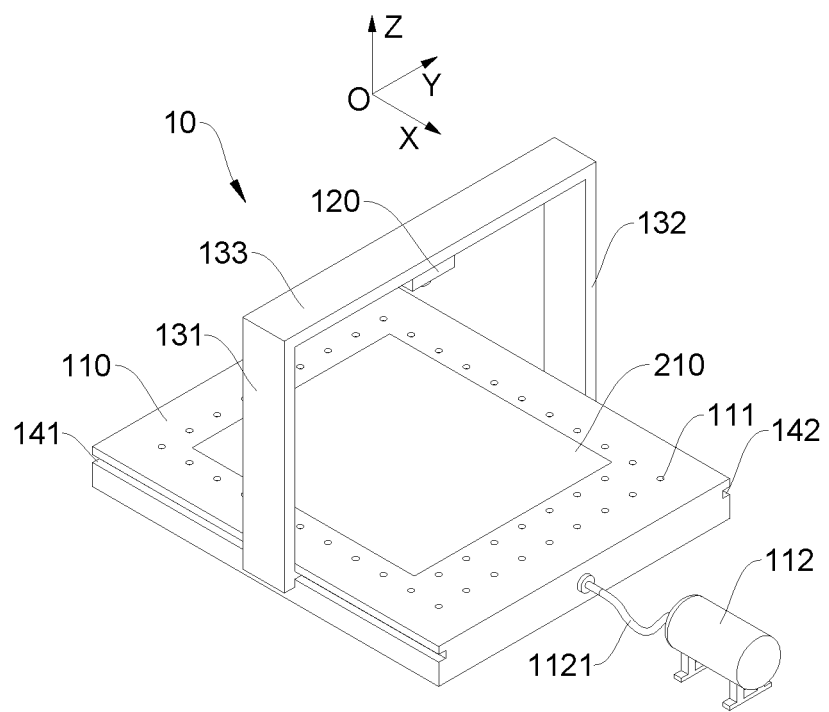
FIG. 3 shows a structure diagram of a detection system, on which a flexible and planar sample is placed, according to the present application.

The object carrier 110 is used for placing an object to be detected. Referring to FIG. 3, for flexible and planar objects 210, for example objects made of paper material (e.g., scripts and paintings) or textile fabrics; it is prone to have creases during the detection, thereby influencing the detection result. Therefore, in order to tightly attach a flexible and planar object 210 onto the surface of the object carrier 110, thus to effectively ensure the flat spreading of the object, to prevent the creases of the object itself from influencing the accuracy of the detection result, referring to FIGS. 1-4, the detection system further comprises an air pump 112; and FIG. 2 shows that there is a cavity 1101 inside the object carrier 110, and an air exhaust pipe 1121 of the air pump is communicated with the cavity 1101. Furthermore, there are multiple tiny holes on the object carrier 110, each of which is communicated with the cavity 1101. The air pump 112 is configured to exhaust air in the cavity 1101 inside the object carrier 110. The cavity 1101 is indicated by the dashed box in FIG. 2. When in use, the flexible and planar object 210 is placed on the surface of the object carrier 110 to cover part or all of the tiny holes on the surface of the object carrier 110, and a negative pressure is formed between the flexible and planar object 210 placed on the surface of the object carrier 110 and the cavity 1101 by exhausting air by the air pump 112 so that the object is tightly attached onto the surface of the object carrier 110, thereby preventing the creases of the object itself from influencing the accuracy of the detection result.

To be convenient to detect the flexible and planar object 210, referring to FIG. 3, the detection system further comprises a gantry 130, a first guiderail 141 and a second guiderail 142. Specifically, as shown in FIG. 3, the first guiderail 141 is arranged on a side of the object carrier 110 in a length direction of the object carrier 110 (X-axis direction in FIG. 3), and the second guiderail 142 is arranged on the other side of the object carrier 110 in the length direction of the object carrier 110. The gantry 130 comprises a first support bar 131, a second support bar 132 and a cross bar 133, wherein a bottom end of the first support bar 131 is in sliding connection to the first guide rail 141, a bottom end of the second support bar 132 is in sliding connection to the second guide rail 142, a top end of the first support bar 131 and a top end of the second support bar 132 are in connection to two ends of the cross bar 133, respectively, and the cross bar 133 is arranged at a specific height from the object carrier 110 and extends in a width direction of the object carrier (Y-axis direction in FIG. 3). The first data collection device 120 is arranged on the cross bar 133. That is, the first data collection device 120 can move in the X-axis direction together with the gantry 130. In addition, the first data collection device 120 is in sliding connection to the cross bar 133. That is, the first data collection device 120 can move along the cross bar 133, so that the surface of the flexible and planar object 210 can be scanned two-dimensionally by the first data collection device 120 to collect the imaging spectral data of the surface of the object.

Figure 4:
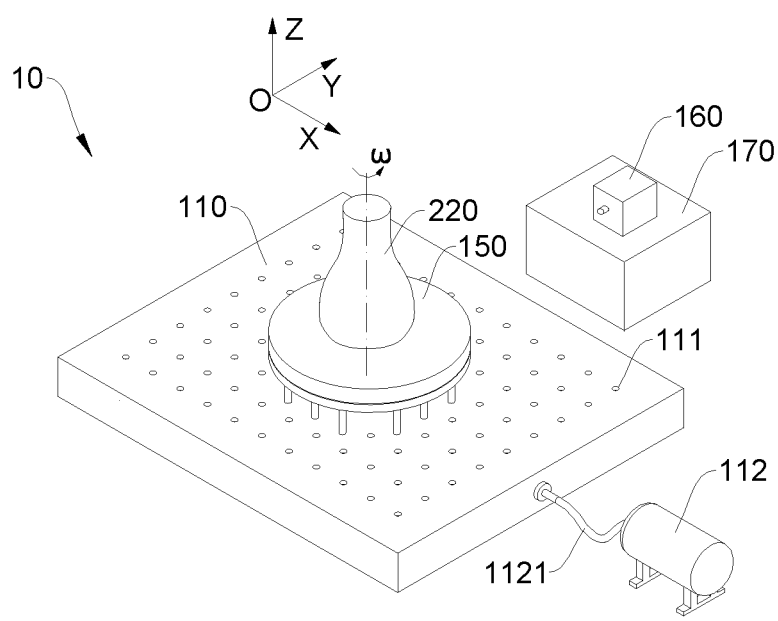
FIG. 4 shows a structure diagram of another detection system, on which a stereoscopic sample is placed, according to the present application.
Figure 5:
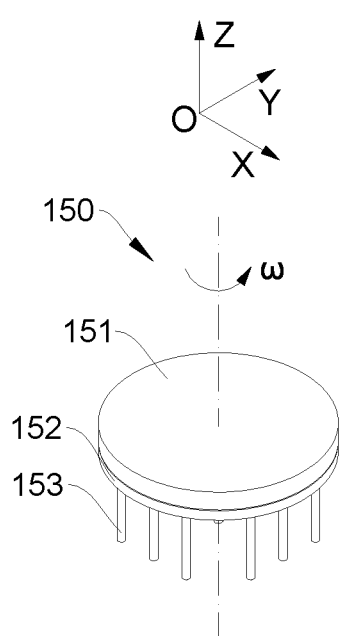
FIG. 5 shows a structure diagram of a rotary platform of FIG. 4.

In addition, in order to enable the detection system to not only accurately detect flexible and planar objects 210, and, referring to FIG. 4, also conveniently detect the authenticity of stereoscopic objects 220 such as bronzes and porcelains, FIG. 4 also shows that the detection system further comprises a rotary platform 150 for placing an object. The rotary platform 150 is detachably arranged on the surface of the object carrier 110. Specifically, as shown in FIG. 5, the rotary platform 150 comprises a positioning pin 153, a fixed stage 152 and a rotary stage 151. One end of the positioning pin 153 is in connection to a bottom face of the fixed stage 152. The rotary stage 151 is arranged on a top face of the fixed stage 152 and is able to rotate in relative to the top face of the fixed stage 152. The rotary stage 151 is of a rotationally symmetric structure, and is preferably cylindrical or disc-shaped. The dotted line in FIG. 5 indicates the rotary centerline of the rotary stage 151. The rotary stage 151 can rotate about the rotary centerline in the ω direction. When it is needed to detect stereoscopic objects 220 such as bronzes and porcelains, the positioning pin 153 is inserted into a positioning hole formed on the surface of the object carrier 110 in order to mount the rotary platform 150 on the object carrier 110, and then an object to be detected is placed on the rotary stage, as shown in FIG. 4. In this case, a second data collection device 160 may be arranged on a side of the object carrier 110. The object is driven by the rotary stage to rotate, so that the surface of the object is scanned by the second data collection device 160 to collect the imaging spectral data of the surface of the object. Preferably, a lifting platform 170 may be arranged on a side of the object carrier 110, and the second data collection device 160 is placed on the lifting platform 170, so that, through the lifting platform 170, the surface of the object is scanned by the second data collection device 160 in a height direction of the object carrier 110 (Z-axis direction in FIG. 4) to collect the imaging spectral data of the surface of the object.

The data collection device (the first data collection device 120 in FIG. 3 and the second data collection device 160 in FIG. 4) is in electrical connection to the control device (not shown in FIG. 3 and FIG. 4). The data collection device acquires the imaging spectral data of the surface of the object and sends it to the control device. The control device processes the imaging spectral data to obtain the detection result of the object. The specific processing process may refer to the detection method provided in an embodiment of the present application.

As one implementation, the data collection device may specifically comprise a light source module and an imaging spectral camera. Preferably, both the imaging spectral camera and the light source module are in electrical connection to the control device. The light source module is configured to emit and irradiate light beams onto the surface of the object under the control of the control device. The imaging spectral camera is configured to collect the imaging spectral data of the object under the control of the control device. The light beams emitted by the light source module are incident on the surface of the object. The light beams entering the imaging spectral camera, after being reflected by the object, are converted to the imaging spectral data by the imaging spectral camera. Wherein, the imaging spectral camera may be an imaging spectrometer or a multispectral camera or the like. The imaging spectral data is a spectral data cube, including image information and spectral information of the surface of the object.

As another implementation, the data collection device may also comprise a light source module, a spectrometer and a capturing device. The spectrometer is configured to collect spectral information of the object, and the capturing device is configured to collection image information of the object, wherein the collected image information can be used for three-dimensionally reconstructing the object to obtain the three-dimensional morphology data of the object. In practical application, the capturing device may be an image collection apparatus, for example, a video camera or a camera. The three-dimensional morphology data may be collected by a laser range finder or obtained by collecting and processing stereo image pairs.

Figure 6:
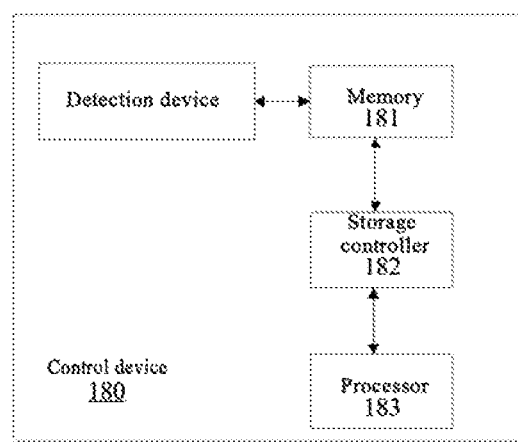
FIG. 6 shows a structural block diagram of a control device according to the present application.

Referring to FIG. 6, the control device 180 comprises a detection device, a memory 181, a storage controller 182 and a processor 183. The memory 181, the storage controller 182 and the processor 183 are in direct or indirect electrical connection, in order to realize the transmission of data or interaction. For example, these elements may be electrically connected by one or more communication buses or signal buses. Wherein, the memory 181 may be used for storing software programs and modules, for example, program instructions/modules corresponding to the detection method and device in an embodiment of the present application. The memory 181 may comprise a high-speed random access memory and may further comprise a nonvolatile memory, for example, one or more magnetic storage devices, flash memories, or other nonvolatile solid-state memories. The processor 183 may be an integrated circuit chip having a data processing function, for example, a single-chip microcomputer, a DSP, an ARM or an FPGA. The processor 183 executes various function applications and data processing, i.e., implements the detection method according to the present application, by running the software programs and modules stored in the memory 181.

It may be understood that the detection system 10 as shown in FIGS. 1-4 is merely an exemplary application environment of the detection method and device according to the present application and the present application is not limited thereto. The structure of the control device 180 as shown in FIG. 6 is also exemplary. The control device 180 may further comprise more or less components than those shown in FIG. 6. For example, the control device 180 may be a computer, or may have a configuration different from that shown in FIG. 6. The various components shown in FIG. 6 may be implemented by hardware, software or a combination thereof.

The technical solutions in the present application will be clearly and completely described below with reference to the drawings in the present application. Apparently, the embodiments described herein are merely some but not all of the embodiments of the present application. Usually, components in the present application described and shown in the drawings may be arranged and designed in various configurations. Therefore, the detailed description of the embodiments of the present application provided in the drawings is not intended to limit the scope of the present application claimed, just to explain the selected embodiments of the present application. All other embodiments obtained by a person of ordinary skill in the art, based on the embodiments in the present application, without paying any creative effort, shall fall into the scope of the present application.

Figure 7:
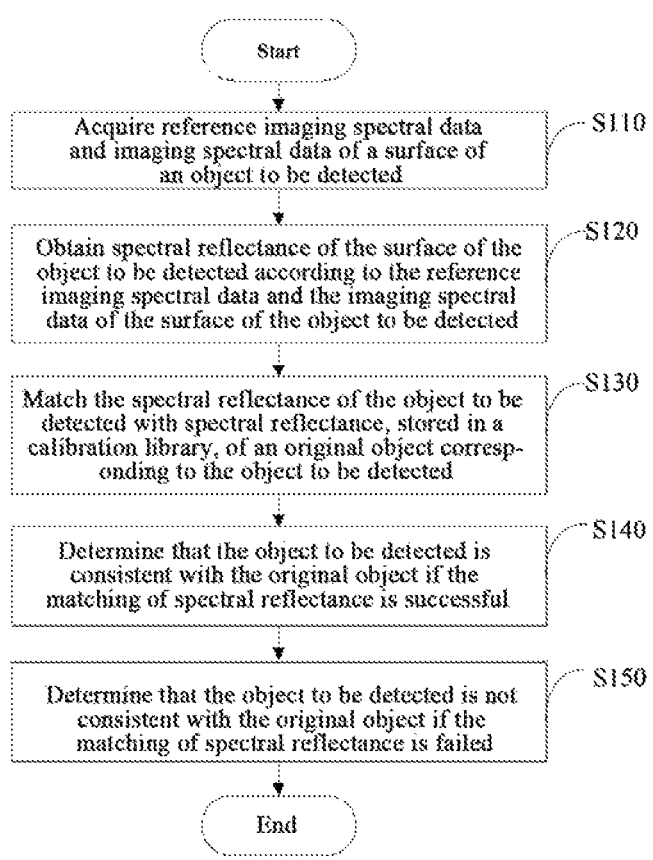
FIG. 7 shows a method flowchart of a detection method according to the present application.

FIG. 7 shows a flowchart of a detection method according to the present application. Referring to FIG. 7, this embodiment describes a processing flow performed in the control device 180. The method comprises:

S110: Reference imaging spectral data and imaging spectral data of a surface of an object to be detected are acquired. It may be understood that the imaging spectral data is image-spectrum merged data. It refers to a stack of images of an object obtained by imaging in multiple successive bands, i.e., an image cube. The imaging spectral data has two spatial dimensions and one spectral dimension. That is, it contains both image information and spectral information of an object. The spectral intensity data of each pixel in each band can be obtained by the imaging spectral data.

It may be understood that the irradiation light source, which is used during the process of acquiring reference imaging spectral data and imaging spectral data of a surface of an object to be detected, has stable spectral energy distribution and is continuous in full spectrum, without loss of spectral components as in a fluorescent lamp.

In this embodiment, according to different spectral resolutions, the imaging spectral data may be imaging multispectral data obtained by multispectral imaging, or may be imaging high-spectral data obtained by high-spectral imaging, or may be imaging hyper-spectral data obtained by hyper-spectral imaging. Wherein, the imaging multispectral data has a spectral resolution of 100 nm, the imaging high-spectral data has a spectral resolution of 10 nm, and the imaging hyper-spectral data has a spectral resolution of 1 nm. The spectral range can cover UV, visible light and infrared bands. To obtain a better spectral resolution, in the present application, the imaging hyper-spectral data obtained by hyper-spectral imaging is preferred.

In this embodiment, the control device 180 acquires the reference imaging spectral data in such a way that a standard whiteboard is placed on the object carrier of the detection system shown in FIG. 1 or on the rotary stage of the detection system as shown in FIG. 4. The imaging spectral data of the standard whiteboard is measured by the data collection device (the first data collection device 120 in FIG. 3 and the second data collection device 160 in FIG. 4), and the measured imaging spectral data of the standard whiteboard is sent to the control device 180. The control device 180 uses the received imaging spectral data of the standard whiteboard as the reference imaging spectral data.

Wherein, the standard whiteboard is a standard diffuse reflection reference for measurement of reflectance, and may be made of different material, for example, barium sulfate, polytetrafluoroethylene and the like. The standard whiteboard has high spectral reflectance. For example, the existing standard whiteboard has spectral reflectance of above 98% for light in wide spectral bands, from the UV band, the visible light band to the near infrared band. Of course, the standard whiteboard may be replaced with other calibration objects, such as white paper and ceramic whiteboards, having spectral reflectance of above 98%.

It is to be noted that, both the reference imaging spectral data and the imaging spectral data of the surface of the object to be detected are expressions of the spectral reflected energy of the irradiation light source when acting on the standard whiteboard or the object to be detected. The values of the imaging spectral data in a same imaging environment are comparable. The values of the imaging spectral data in different imaging environments are not comparable.

When imaging spectral cameras of different models are used, the values of the obtained spectral reflected energy image data may be not comparable due to the difference in spectral response characteristics of different cameras.

When the spectral band range is wide, the band image may lose the remarkable feature due to the complementation of energy of different wavelengths in this range.

When the standard whiteboard reflects uniformly, the spectral reflectance at any position of the standard whiteboard is the same. In this case, the imaging spectral data at any position of the standard whiteboard can be used as the reference imaging spectral data.

It is to be noted that, in addition to the above way, the reference imaging spectral data may also be stored in advance. For example, when it is needed to detect multiple objects to be detected within a specific period of time, it is possible to acquire reference imaging spectral data and then store it during the detection of the first object to be detected, and directly use the reference imaging spectral data in the detection of the remaining objects to be detected. Of course, in order to improve the accuracy of the detection result, the reference imaging spectral data used in this embodiment is preferably acquired in real time. That is, the reference imaging spectral data is acquired, whenever one object to be detected is detected.

In this step, the control device 180 acquires the imaging spectral data of a surface of an object to be detected in such a way that the imaging spectral data of a surface of an object to be detected is measured by a data collection device and the measured imaging spectral data of the surface of the object to be detected is sent to the control device 180.

The acquired imaging spectral data of the surface of the object to be detected may be the imaging spectral data of a specific region of the surface of the object to be detected or the imaging spectral data of the whole surface of the object to be detected. For example, when an object to be detected is a flexible and planar object, for example a script or a painting, the object to be detected may be spread on the object carrier shown in FIG. 1, and the surface of the object to be detected is two-dimensionally scanned by the first data collection device 120 to obtain the imaging spectral data of the surface of the object to be detected. It is to be noted that, in order to prevent the placement position of the object to be detected from influencing the detection result, a reference point or a reference line may be formed on the object carrier in advance, and a mark is specified on the object to be detected in advance. When placing the object to be detected, it is needed to ensure the specified mark to correspond to the reference point or the reference line. For example, when an object to be detected is a rectangular script or painting, two reference lines forming a right angle are formed on the object carrier in advance, and the right-angle sides of a specific right angle of the script or painting are specified as the marks. When placing the object to be detected, it is needed to ensure the marks of the script or painting to correspond to the reference lines. When an object to be detected is a flexible and planar object, for example a textile, such as a piece of cloth, it is needed to carry out positioning according to the feature points on the textile.

Similarly, when an object to be detected is a stereoscopic object, for example a bronze or porcelain or the like, a reference point or a reference line may be formed on the object carrier in advance, and a mark is specified on the object to be detected in advance. When placing the object to be detected on the object carrier, it is needed to ensure the specified mark to correspond to the reference point or the reference line.

S120: Spectral reflectance of the surface of the object to be detected is obtained according to the reference imaging spectral data and the imaging spectral data of the surface of the object to be detected. In specific implementations, the spectral reflectance of the surface of the object to be detected can be calculated according to the reference imaging spectral data, the spectral reflectance of the standard whiteboard, and the imaging spectral data of the surface of the object to be detected.

It may be understood that, in order to improve the accuracy of the detection result, the reference imaging spectral data and the imaging spectral data of the surface of the object to be detected are preferably obtained under same imaging light conditions. That is, the data collection device obtains the imaging spectral data of the standard whiteboard and the imaging spectral data of the surface of the object to be detected under same imaging light conditions, respectively, and sends both the imaging spectral data of the standard whiteboard and the imaging spectral data of the surface of the object to be detected to the control device 180. Specifically, same imaging light conditions mean same external ambient light conditions and the use of data collection devices having same performance indicators. If data collection devices having different performance indicators are used, calibration of consistency is required. It is to be noted that the word "same" means that they are the same in a broad sense. Within an acceptable error range, there may be slight difference.

Figure 8:
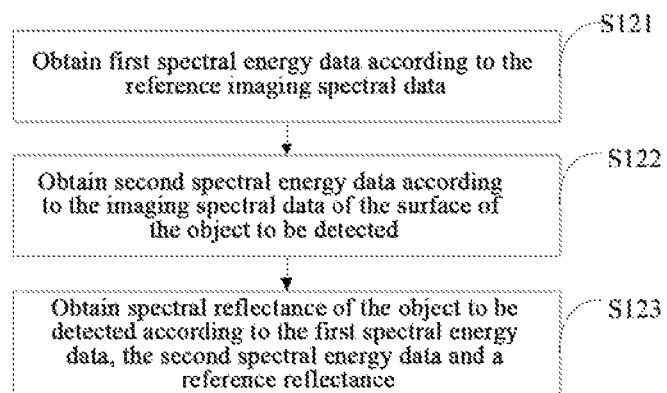
FIG. 8 shows a step flowchart of a step S120 in the detection method according to the present application.

As shown in FIG. 8, the step S120 specifically comprises steps S121, S122 and S123.

S121: First spectral energy data is obtained according to the reference imaging spectral data.

The spectral energy distribution at each pixel point in an image can be obtained according to the image information and the spectral information included in the reference imaging spectral data. That is, each pixel point corresponds to a spectral energy distribution curve. The spectral energy distribution curve is related to the first spectral energy data.

As an implementation, the reference imaging spectral data includes pixel points $P_1(u_1,v_1)$, $P_2(u_2,v_2)$, ..., $P_m(u_m,v_m)$, wherein $(u_1,v_1)$, $(u_2,v_2)$, ..., $(u_m,v_m)$ respectively represent coordinates of a pixel. It may be understood that, according to a camera calibration model stored in advance, the coordinates of the pixel may be converted to three-dimensional coordinates of the data collection device in a world coordinate system. By taking $P_1$ as an example, the spectral energy distributions corresponding to $P_1$ are $I_{ref}(u_1,v_1,\lambda_1)$, $I_{ref}(u_1,v_1,\lambda_2)$, ..., $I_{ref}(u_1,v_1,\lambda_n)$, wherein $\lambda_1, \lambda_2, ..., \lambda_n$ represent the spectral wavelength in the reference imaging spectral data or the central wavelength in a spectral range.

S122: Second spectral energy data is obtained according to the imaging spectral data of the surface of the object to be detected.

The imaging spectral data of the surface of the object to be detected may be the imaging spectral data obtained by scanning the surface of the object to be detected by the data collection device. According to the imaging spectral data at each scanned position, the reflected spectral energy at each coordinate point corresponding to the scanned position, i.e., the second spectral energy data, can be obtained.

It may be understood that, in order to simplify the detection process, the imaging spectral data of the surface of the object to be detected may be the imaging spectral data of a specific region of the surface of the object to be detected. Wherein, the specific region may be set according to requirements. For example, when an object to be detected is a rectangular script or painting, the specific region may be a rectangular region having a specified coordinate position and an area of M×N in the object to be detected. The reflected spectral energy at a corresponding coordinate point in the specific region can be obtained according to the imaging spectral data in the specific region. Alternatively, the reflected spectral energy at multiple preset feature points in the imaging spectral data of the surface of the object to be detected can be acquired as the second spectral energy data.

S123: Spectral reflectance of the object to be detected is obtained according to the first spectral energy data, the second spectral energy data and a reference reflectance. The reference reflectance is the spectral reflectance of the standard whiteboard, which is obtained in advance.

The reference reflectance may be stored in the control device 180 in advance, or may be input in real time. Specifically, the reference reflectance is the spectral reflectance of the standard whiteboard in the step S120. Of course, in order to improve the accuracy of the detection result, the standard whiteboard may be calibrated in advance. That is, the reflectance of the standard whiteboard to light of different wavelengths, which is emitted by the light source module having a wide spectrum of the data collection device, is measured to obtain the spectral reflectance of the standard whiteboard.

The first spectral energy data is represented by $I_{ref}(x,y,z,\lambda)$, the second spectral energy data is represented by $I_{object}(x,y,z,\lambda)$, the reference reflectance is represented by $\rho_{ref}(x,y,z,\lambda)$, and the spectral reflectance of the surface of the object to be detected is represented by $\rho_{object}(x,y,z,\lambda)$. According to the following equation:

$$\rho_{object}(x, y, z, \lambda) = \frac{Iobject(x, y, z, \lambda)}{Iref(x, y, z, \lambda)} \cdot \rho_{ref}(x, y, z, \lambda)$$

the spectral reflectance of the surface of the object to be detected can be obtained, which is represented by $\rho_{object}(x,y,z,\lambda)$. Wherein, $(x,y,z)$ represents three-dimensional coordinates of the surface of the object to be detected, and $\lambda$ represents the spectral wavelength.

S130: The spectral reflectance of the object to be detected is matched with spectral reflectance, stored in a calibration library, of an original object corresponding to the object to be detected. Specifically, the spectral reflectance of the object to be detected is compared with the spectral reflectance of the original object corresponding to the object to be detected in terms of similarity.

S140: It is determined that the object to be detected is consistent with the original object if the matching of spectral reflectance is successful. In practical applications, if the result of comparison between the spectral reflectance of the object to be detected with the spectral reflectance of the original object corresponding to the object to be detected in terms of similarity indicates that the similarity is greater than a preset similarity threshold, it is considered that the matching of spectral reflectance is successful. The preset similarity threshold may be set flexibly according to actual requirements. For example, the preset similarity threshold may be set as 98%. Or, considering that the measured data may have certain difference, the preset similarity threshold may be decreased properly. For example, the preset similarity threshold may be set as 90% or the like. How the object to be detected is similar to the original object may be represented directly by the similarity.

S150: It is determined that the object to be detected is not consistent with the original object if the matching of spectral reflectance is failed. In practical applications, if the result of comparison between the spectral reflectance of the object to be detected with the spectral reflectance of the original object corresponding to the object to be detected in terms of similarity indicates that the similarity is less than the preset similarity threshold, it is considered that the matching of spectral reflectance is failed. How the object to be detected is similar to the original object may be represented directly by the similarity.

The identification information of the original object and the spectral reflectance of the original object are included in the calibration library. Wherein, the original objects may be valuables such as cultural relics or artworks, which have been identified to be authentic, or may be objects to be lent to others. The detection method of the present application needs to detect whether an object to be detected is the original object, that is, detect whether an object to be detected is authentic or counterfeit. For example, if a person wants to buy a painting which is supposed to be a great painting of a famous painter. In this case, the original object is the authentic painting and the object to be detected is the painting to be bought. Also for example, Mr. Zhang will lend Mr. Li an object A, and after a period of time, Mr. Li returns an object A' to Mr. Zhang. In this case, the object A is the original object and the object A' is the object to be detected.

The identification information of the original object is the unique identification code of the original object. In this embodiment, the identification information may be the name of the original object. Or, the identification information may also be an identification code set for the original object in advance. The identification code may also be considered as the unique identity of the original object, and may consist of digital sequences and character strings. In this case, an identification code dictionary may be set in advance. The name, detection time and pictures of each original object and the identification code of the original object may be stored in the identification code dictionary. After obtaining the spectral reflectance of the object to be detected by the step S120, the unique identification code of the object to be detected is acquired, and by the unique identification code of the object to be detected, the spectral reflectance of the original object corresponding to the identification code is found in the calibration library. The spectral reflectance of the object to be detected is matched with the found spectral reflectance of the original object. When the matching is successful, it is indicated that the object to be detected is consistent with the original object, that is, the object to be detected is authentic; and when the matching is failed, it is indicated that the object to be detected is not consistent with the original object, that is, the object to be detected is counterfeit or is an alternative. It is to be noted that, since the object to be detected corresponds to the original object one by one, the unique identification code of the object to be detected should be consistent with that of the original object corresponding to the object to be detected. As a way of acquiring the unique identification code of the object to be detected, the user may input the unique identification code of the object to be detected to the control device 180.

In this embodiment, the spectral reflectance of the object to be detected may be matched with the found spectral reflectance of the original object in the following way: measuring similarity between the spectral reflectance of the object to be detected and the found spectral reflectance of the original object, to obtain a reflectance similarity factor corresponding to each band; weighted summing reflectance similarity factors of all bands to obtain similarity between the object to be detected and the original object; determining that matching of the spectral reflectance of the object to be detected with the found spectral reflectance of the original object is successful, if the obtained similarity is greater than or equal to a preset similarity threshold; and determining that matching of the spectral reflectance of the object to be detected with the found spectral reflectance of the original object is failed, if the obtained similarity is less than the preset similarity threshold. Wherein, the similarity threshold may be obtained by a lot of tests.

Specifically, the reflectance similarity factor may be acquired in the following way:

The spectral reflectance is divided into bands according to a preset rule. For example, it can be divided into bands $\lambda_1-\lambda_{m1}, \lambda_{m1+1}-\lambda_{m2}, \ldots, \lambda_{mk+1}-\lambda_n$. In this case, for the band $\lambda_1-\lambda_{m1}$, the spectral reflectance of the object to be detected is $(\rho_1, \rho_2, \ldots, \rho_{m1})$ and the spectral reflectance of the original object is $(\rho'_1, \rho'_2, \ldots, \rho'_{m1})$; for the band $\lambda_{m1+1}-\lambda_{m2}$, the spectral reflectance of the object to be detected is $(\rho_{m1+1}, \rho_{m1+2}, \ldots, \rho_{m2})$ and the spectral reflectance of the original object is $(\rho'_{m1+1}, \rho'_{m1+2}, \ldots, \rho'_{m2})$; $\ldots$; and for the band $\lambda_{mk+1}-\lambda_n$, the spectral reflectance of the object to be detected is $(\rho_{mk+1}, \rho_{mk+2}, \ldots, \rho_n)$ and the spectral reflectance of the original object is $(\rho'_{mk+1}, \rho'_{mk+2}, \ldots, \rho'_n)$.

The reflectance similarity factor between the spectral reflectance of the object to be detected and the spectral reflectance of the original object, corresponding to each band, is acquired. For example, the reflectance similarity factor between the spectral reflectance of the object to be detected and the spectral reflectance of the original object, corresponding to each band, may be obtained by using the spectral reflectance of the object to be detected and the spectral reflectance of the original object, corresponding to each band, as vectors, by similarity measurement methods such as Euclidean distance algorithms, clustering analysis and cosine algorithms.

Further, a corresponding weight is preset for the reflectance similarity factor corresponding to each band. According to the preset weight, the reflectance similarity factors of all bands are weighted summed to obtain similarity between the object to be detected and the original object. For example, the reflectance similarity factor corresponding to the band $\lambda_1-\lambda_{m1}$ is $\xi_1$ and the weight is $a_1$; the reflectance similarity factor corresponding to the band $\lambda_{m1+1}-\lambda_{m2}$ is $\xi_2$ and the weight is $a_2$; $\ldots$; and the reflectance similarity factor corresponding to the band $\lambda_{mk+1}-\lambda_n$ is $\xi_s$ and the weight is $a_s$. In this case, the similarity $\delta$ between the object to be detected and the original object is: $\delta=a_1\xi_1+a_2\xi_2+\ldots+a_s\xi_s$.

It may be understood that the detection result of the object to be detected can be obtained only when the spectral reflectance of the original object corresponding to the object to be detected is stored in the calibration library. If the spectral reflectance of the original object corresponding to the object to be detected is not stored in the calibration library, it is unable to carry out the detection. Therefore, before executing the step S110, it is needed to store the spectral reflectance of the original object corresponding to the object to be detected in the calibration library. The method for acquiring the spectral reflectance of the original object is the same as the method for acquiring the spectral reflectance of the object to be detected as described in the steps S110 and S120. Specifically, the method for acquiring the spectral reflectance of the original object may also comprise:

A1: Reference imaging spectral data and imaging spectral data of a surface of an original object is acquired.

A2: Spectral reflectance of the surface of the original object is obtained according to the reference imaging spectral data and the imaging spectral data of the surface of the original object.

The difference between the step A1 and the step S110 and between the step A2 and the step S120 lies in the detected target. The detected target in the steps S110 and S120 is the object to be detected, and the detected target in the steps A1 and A2 is the original object. Therefore, the specific implementations of the steps A1 and A2 may refer to the steps S110 and S120 and will not be explained repeatedly here.

A3: The spectral reflectance of the original object is added in the calibration library.

After adding the spectral reflectance of the original object in the calibration library, it can be detected whether the object to be detected corresponding to the original object is consistent with the original object by the detection method according to this embodiment.

In the detection method of the present application, the uniqueness of an object is represented by the spectral reflectance, and the authenticity of an object is identified by considering the spectral reflectance as the identity information of the object. The spectral reflectance of an object to be detected is matched with spectral reflectance, stored in a calibration library in advance, of the original object. It is indicated that the object to be detected is the original object, that is, the object to be detected is authentic, if the matching of spectral reflectance is successful. It is indicated that the object to be detected is not the original object, that is, the object to be detected is not authentic, if the matching of spectral reflectance is failed. In addition, it may be understood that, if the reflected spectral energy of an object is directly used as an indicator for detecting the authenticity of the object, the detection result may be influenced by the external ambient light of the detection system. Furthermore, after a period of time of use of the light source in the system, the change in spectral components will also cause the change in reflected spectral energy of the object, and thus the detection result is greatly influenced. Therefore, compared with the method for directly using the reflected spectral energy of an object as a detection indicator, the detection method according to the present application uses the spectral reflectance as an indicator for detecting the authenticity of the object. This can effectively eliminate the effect of the change in external ambient light and the spectral change of the light source in the system on the detection result, and the accuracy of the detection result is improved.

Figure 9:
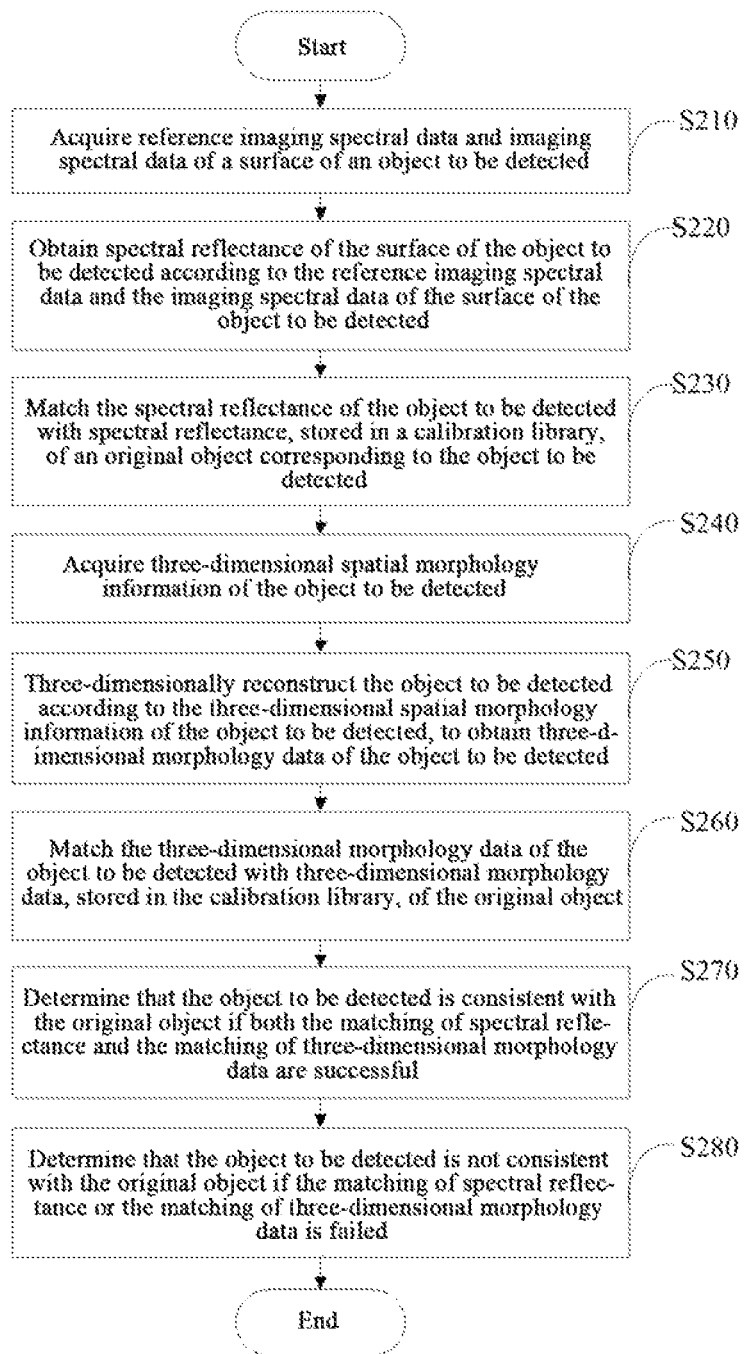
FIG. 9 shows a method flowchart of a detection method according to the present application.

FIG. 9 shows a flowchart of a detection method according to the present application. Referring to FIG. 9, this embodiment describes a processing flow performed in the control device 180. the method comprises:

S210: Reference imaging spectral data and imaging spectral data of a surface of an object to be detected are acquired.

S220: Spectral reflectance of the surface of the object to be detected is obtained according to the reference imaging spectral data and the imaging spectral data of the surface of the object to be detected. Specifically, spectral reflectance of the surface of the object to be detected is obtained according to the reference imaging spectral data, spectral reflectance of a standard whiteboard, and the imaging spectral data of the surface of the object to be detected.

S230: The spectral reflectance of the object to be detected is matched with spectral reflectance, stored in a calibration library, of an original object corresponding to the object to be detected.

In this embodiment, the specific implementations of S210, S220 and S230 may refer to those of S110, S120 and S130 in the above embodiment and will not be explained repeatedly here.

S240: Three-dimensional spatial morphology information of the object to be detected is acquired.

In this embodiment, there may be various ways of acquiring the three-dimensional spatial morphology information. As one implementation, S240 may comprise following steps (a1) and (a2).

(a1): Image information in the imaging spectral data of the surface of the object to be detected is acquired.

In this embodiment, the imaging spectral data of the surface of the object to be detected may be obtained by a data collection device. The imaging spectral data comprises image information and spectral information. On one hand, the spectral information contained in the imaging spectral data is used for analysis of the spectral reflectance of the object to be detected, and on the other hand, the image information contained in the imaging spectral data can be used for three-dimensional construction of the object to be detected.

(a2): The three-dimensional spatial morphology information of the object to be detected is obtained according to the image information.

Stereo image pairs of the surface of the object to be detected can be obtained, according to the image information obtained in the step (a1). These stereo image pairs are the three-dimensional spatial morphology information of the object to be detected, which can be used for three-dimensional construction of the object to be detected.

Of course, in addition to obtaining stereo image pairs in the above way, the stereo image pairs of the object to be detected, i.e., the three-dimensional spatial morphology information of the object to be detected, can be obtained by transversely scanning the object to be detected by a capturing device.

As one implementation, the step S240 may comprise following steps (b1) and (b2).

(b1): An image sequence obtained by capturing the object to be detected is acquired. It is specifically a transversely stereoscopic or longitudinally stereoscopic image sequence.

The object is captured by a capturing device from different angles to obtain multiple images, and the obtained multiple images are sent to the control device 180 to form an image sequence. The order of the multiple images in the image sequence may be set arbitrarily. For example, the multiple images may be arranged in an order of capturing. Of course, the multiple images may be arranged in a preset capturing angle order.

(b2): Three-dimensional spatial morphology information of the object to be detected is obtained according to the image sequence.

The control device 180 obtains matching information of an image according to the image sequence obtained in the step (b1). The matching information may be used as the three-dimensional spatial morphology information of the object to be detected in the step (b2) to realize the three-dimensional reconstruction of the object to be detected. Wherein, the matching information may be obtained by identifying an image included in the image sequence, specifically by extracting features of the image. For images, each image has features that can distinguish it from other images. There are many existing feature extraction methods and matching methods. For example, the feature extraction and matching are performed by directional gradient histogram extraction algorithms, main component analysis methods, and the like, which will not be explained repeatedly here.

In this embodiment, the capturing device may be a camera supporting central projection, or may be a camera having a telecentric lens.

S250: The object to be detected is three-dimensionally reconstructed according to the three-dimensional spatial morphology information of the object to be detected, to obtain three-dimensional morphology data of the object to be detected.

Specifically, when the three-dimensional spatial morphology information is the stereo image pairs, a spatial stereo model of the object to be detected, having a orthographic projection relationship, can be obtained according to the stereo image pairs, to obtain the three-dimensional morphology data of the object to be detected. When the three-dimensional spatial morphology information is the matching information, spatial three-dimensional coordinates of the object to be detected can be obtained by combining the matching information and the preset internal and external parameters calibrated by the capturing device. In this way, the three-dimensional reconstruction of the object to be detected is realized, to obtain the three-dimensional morphology data of the object to be detected.

S260: The three-dimensional morphology data of the object to be detected is matched with three-dimensional morphology data, stored in the calibration library, of the original object.

In this embodiment, the identification information of the original object, the spectral reflectance of the original object and the three-dimensional morphology data of the original object are included in the calibration library. Wherein, the original objects may be valuables such as cultural relics or artworks, which have been identified to be authentic, or may be objects lent to others. The identification information of the original object is the unique identification code of the original object. The specific description may refer to the corresponding content in the above embodiment, and will not be explained repeatedly here.

After obtaining the three-dimensional morphology data of the object to be detected by the step S250, the unique identification code of the object to be detected is acquired, and by the unique identification code of the object to be detected, the three-dimensional morphology data of the original object corresponding to the identification code is found in the calibration library.

In order to simplify the detection process, in a preferred implementation of the present application, after the three-dimensional morphology data of the object to be detected is obtained, the three-dimensional morphology data of a preset region of the object to be detected is further obtained. Of course, the three-dimensional morphology data of the original object corresponding to the object to be detected, stored in the calibration library, is also the three-dimensional morphology data of the preset region of the original object. Wherein, the preset region may be set according to requirements. For example, the range of coordinates $(x_q,y_q,z_q)$ of the preset region may be: $x_1 \leq x_q \leq x_2$, $y_1 \leq y_q \leq y_2$, $z_1 \leq z_q \leq z_2$.

In this case, the three-dimensional morphology data of the object to be detected may be matched with the found three-dimensional morphology data of the original object in the following way: acquiring coordinate points of the object to be detected and coordinate points of the original object, within the preset region; selecting, from the obtained coordinate points, coordinate points whose x-coordinate value and y-coordinate value are both the same, to form a plurality of pairs of coordinate points; acquiring a difference between a z-coordinate value of a coordinate point of the object to be detected and a z-coordinate value of a coordinate point of the original object, among each of the pairs of coordinate points; calculating a multi-moment function value between all coordinate points and corresponding differences; determining that matching of the three-dimensional morphology data of the object to be detected with the found three-dimensional morphology data of the original object is successful, if the obtained multi-moment function value is less than a preset threshold; and determining that matching of the three-dimensional morphology data of the object to be detected with the found three-dimensional morphology data of the original object is failed, if the obtained multi-moment function value is greater than or equal to the preset threshold. Wherein, the preset threshold may be obtained by a lot of tests. The multi-moment function value comprises a second-moment, or above, function value, wherein the second-moment function value is the variance. Therefore, in practical applications, the variance between all coordinate points and the corresponding differences can be calculated. It is determined that the matching of the three-dimensional morphology data of the object to be detected with the found three-dimensional morphology data of the original object is successful, if the obtained variance is less than a preset variance threshold; and it is determined that the matching of the three-dimensional morphology data of the object to be detected with the found three-dimensional morphology data of the original object is failed, if the obtained variance is greater than or equal to the preset variance threshold. Wherein, the preset variance threshold may be obtained by a lot of tests. Of course, in addition to the above way, there may be other ways of matching the three-dimensional morphology data of the object to be detected with the found three-dimensional morphology data of the original object. For example, the standard deviation between differences corresponding to all pairs of coordinate points can be calculated.

It is to be noted that, in this embodiment, the order of the steps S210 to S260 is not defined. The order for executing the steps S210 to S260 in the flowchart shown in FIG. 9 is merely an example.

S270: It is determined that the object to be detected is consistent with the original object if both the matching of spectral reflectance and the matching of three-dimensional morphology data are successful.

It may be determined that the object to be detected is consistent with the original object, that is, the object to be detected is authentic, if the matching result obtained in the step S230 indicates that the matching of the spectral reflectance of the object to be detected with the found spectral reflectance of the original object is successful and the matching result obtained in the step S260 indicates that the matching of the three-dimensional morphology data of the object to be detected with the found three-dimensional morphology data of the original object is successful.

S280: It is determined that the object to be detected is not consistent with the original object if the matching of spectral reflectance or the matching of three-dimensional morphology data is failed.

It may be determined that the object to be detected is not consistent with the original object, that is, the object to be detected is counterfeit, if the matching result obtained in the step S230 indicates that the matching of the spectral reflectance of the object to be detected with the found spectral reflectance of the original object is failed and the matching result obtained in the step S260 indicates that the matching of the three-dimensional morphology data of the object to be detected with the found three-dimensional morphology data of the original object is failed.

It may be understood that the detection result of the object to be detected can be obtained only when the spectral reflectance of the original object corresponding to the object to be detected is stored in the calibration library. If the spectral reflectance and three-dimensional morphology data of the original object corresponding to the object to be detected are not stored in the calibration library, it is unable to carry out the detection. Therefore, before executing the step S210, it is needed to store the spectral reflectance and three-dimensional morphology data of the original object corresponding to the object to be detected in the calibration library.

Wherein, the method for acquiring the spectral reflectance of the original object may refer to the steps A1, A2 and A3 in the above embodiment, and will not be explained repeatedly here. The method for acquiring the three-dimensional morphology data of the original object may comprise:

B1: Three-dimensional spatial morphology information of the original object is acquired.

B2: The original object is three-dimensionally reconstructed according to the three-dimensional spatial morphology information of the original object, to obtain three-dimensional morphology data of the original object.

The difference between the step B1 and the step S240 and between the step B2 and the step S250 lies in the detected target. The detected target in the steps S240 and S250 is the object to be detected, and the detected target in the steps B1 and B2 is the original object. Therefore, the specific implementations of the steps B1 and B2 may refer to the steps S240 and S250 and will not be explained repeatedly here.

B3: The three-dimensional morphology data of the original object is added in the calibration library.

After adding the spectral reflectance of the original object in the calibration library and also three-dimensional morphology data of the original object in the calibration library, it can be detected whether the object to be detected corresponding to the original object is consistent with the original object by the detection method according to this embodiment.

In the detection method of the present application, the uniqueness of an object is represented by the spectral reflectance and the three-dimensional morphology data, and the authenticity of an object is identified by considering the spectral reflectance and the three-dimensional morphology data together as the identity information of the object. On the basis of the first embodiment, the accuracy of the detection result of objects, particularly oil paintings, is further improved.

Figure 10:
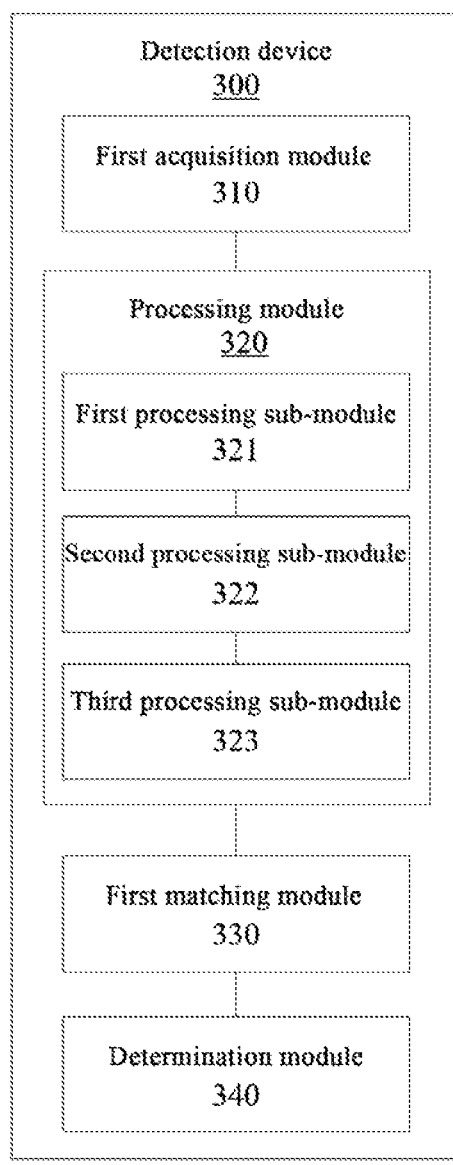
FIG. 10 shows a block diagram of functional modules of a detection device according to the present application.

FIG. 10 shows a schematic diagram of functional modules of a detection device according to the present application. The detection device 300, which is run on the control device 180, is configured to implement the detection method provided in the above embodiments. The detection device 300 comprises a first acquisition module 310, a processing module 320, a first matching module 330 and a determination module 340.

Wherein, the first acquisition module 310 is configured to acquire reference imaging spectral data and imaging spectral data of a surface of an object to be detected.

The processing module 320 is configured to obtain spectral reflectance of the surface of the object to be detected according to the reference imaging spectral data and the imaging spectral data of the surface of the object to be detected. In the specific implementation, the processing module 320 is configured to obtain spectral reflectance of the surface of the object to be detected according to the reference imaging spectral data, spectral reflectance of a standard whiteboard, and the imaging spectral data of the surface of the object to be detected.

The first matching module 330 is configured to match the spectral reflectance of the object to be detected with spectral reflectance, stored in a calibration library, of an original object corresponding to the object to be detected.

The determination module 340 is configured to determine that the object to be detected is consistent with the original object if the matching of spectral reflectance is successful, and determine that the object to be detected is not consistent with the original object if the matching of spectral reflectance is failed.

Specifically, the processing module 320 comprises a first processing sub-module 321, a second processing sub-module 322 and a third processing sub-module 323.

The first processing sub-module 321 is configured to obtain first spectral energy data according to the reference imaging spectral data.

The second processing sub-module 322 is configured to obtain second spectral energy data according to the imaging spectral data of the surface of the object to be detected.

The third processing sub-module 323 is configured to obtain spectral reflectance of the object to be detected according to the first spectral energy data, the second spectral energy data and a reference reflectance. Wherein, the reference reflectance is also the spectral reflectance of the standard whiteboard.

Figure 11:
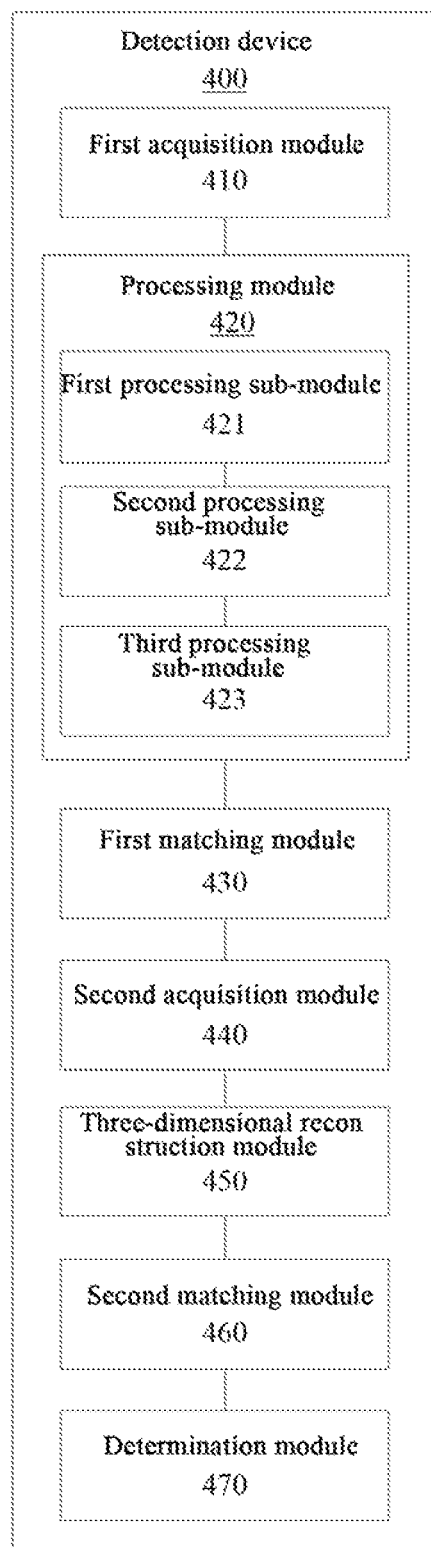
FIG. 11 shows a block diagram of functional modules of a detection device according to the present application.

FIG. 11 shows a schematic diagram of functional modules of another detection device according to the present application. The detection device 400, which is run on the control device 180, is configured to implement the detection method provided in the second embodiment. The detection device 400 comprises a first acquisition module 410, a processing module 420, a first matching module 430, a second acquisition module 440, a three-dimensional reconstruction module 450, a second matching module 460 and a determination module 470.

Wherein, the first acquisition module 410 is configured to acquire reference imaging spectral data and imaging spectral data of a surface of an object to be detected.

The processing module 420 is configured to obtain spectral reflectance of the surface of the object to be detected according to the reference imaging spectral data and the imaging spectral data of the surface of the object to be detected. Specifically, the processing module 420 is configured to obtain spectral reflectance of the object to be detected according to the reference imaging spectral data, spectral reflectance of a standard whiteboard, and the imaging spectral data of the surface of the object to be detected.

The first matching module 430 is configured to match the spectral reflectance of the object to be detected with spectral reflectance, stored in a calibration library, of an original object corresponding to the object to be detected.

The second acquisition module 440 is configured to acquire three-dimensional spatial morphology information of the object to be detected. In one implementation, the second acquisition module is configured to acquire image information in the imaging spectral data of the surface of the object to be detected; and obtain the three-dimensional spatial morphology information of the object to be detected according to the image information.

In another implementation, the second acquisition module is configured to: acquire an image sequence obtained by capturing the object to be detected; and obtain the three-dimensional spatial morphology information of the object to be detected according to the image sequence.

The three-dimensional reconstruction module 450 is configured to three-dimensionally reconstruct the object to be detected according to the three-dimensional spatial morphology information of the object to be detected, to obtain three-dimensional morphology data of the object to be detected.

The second matching module 460 is configured to match the three-dimensional morphology data of the object to be detected with three-dimensional morphology data, stored in the calibration library, of the original object.

The determination module 470 is configured to determine that the object to be detected is consistent with the original object if both the matching of spectral reflectance and the matching of three-dimensional morphology data are successful, and determine that the object to be detected is not consistent with the original object if the matching of spectral reflectance or the matching of three-dimensional morphology data is failed.

Specifically, the processing module 420 comprises a first processing sub-module 421, a second processing sub-module 422 and a third processing sub-module 423.

The first processing sub-module 421 is configured to obtain first spectral energy data according to the reference imaging spectral data.

The second processing sub-module 422 is configured to obtain second spectral energy data according to the imaging spectral data of the surface of the object to be detected.

The third processing sub-module 423 is configured to obtain spectral reflectance of the object to be detected according to the first spectral energy data, the second spectral energy data and a reference reflectance. Wherein, the reference reflectance is also the spectral reflectance of the standard whiteboard.

The above modules may be implemented by software codes, or may be implemented by hardware such as integrated circuit chips.

It is to be noted that the embodiments in the specification are described progressively, the highlight of each embodiment is different from that of other embodiments, and the identical or similar portions of the embodiments can refer to each other.

The implementation principle and the technical effects of the detection device of the present application are the same as the above method embodiments. For the sake of simplicity, those not mentioned in the device embodiments may refer to the corresponding contents in the above method embodiments and will not be explained repeatedly here.

Further, the present application provides a detection apparatus, comprising a memory and a processor, the memory stores a computer program that can be run on the processor, and the computer program, when executed by the processor, enables the processor to perform steps of the method according to any one of the detection methods.

Further, the present application further provides a computer storage medium, which is configured to store computer software instructions used in any one of the detection methods, or programs in hardware, or combined software and hardware units having the same functions.

In the several embodiments of the present application, it should be understood that the disclosed device, method, apparatus and computer storage apparatus may be implemented in other ways. The above described device embodiments are merely exemplary. For example, the flowcharts and block diagrams in the drawings show possibly implemented system architectures, functions and operations of the device, method and computer program product according to several embodiments of the present application. In this regard, each block in the flowcharts or block diagrams may represent one module, a program segment or part of codes, the module, the program segment or part of codes contains one or more executable instructions for implementing the specified logic functions. It should also be noted that, in some alternative implementations, the functions mentioned in the blocks may occur in an order different from that in the drawings. For example, actually, two successive blocks may be executed substantially in parallel. Sometimes, they may be executed in a reverse order, depending upon the involved functions. It is also to be noted that each block in the block diagrams and/or flowcharts and a combination of blocks in the block diagrams and/or flowcharts may be implemented by a hardware-based system specifically for executing a specified function or action, or may be implemented by a combination of dedicated hardware and computer instructions.

In addition, the function modules in the embodiments of the present application may be integrated together to form an independent portion, or may exist as individual modules, or two or more of them may be integrated together to form an independent portion.

If the function is implemented in the form of a software functional module and sold or used as an independent product, it may be stored in a computer-readable storage medium. Based on such understanding, the technical solution of the present application, which is essential or contributes to the prior art, or a part of the technical solution, may be embodied in the form of a software product which is stored in a storage medium, including a number of instructions used to cause a computer apparatus (which may be a personal computer, server, or network apparatus, etc.) to perform all or part of the steps of the methods described in various embodiments of the present application. The foregoing storage medium includes a medium that can store program codes, for example, a USB flash disk, a mobile hard disk, a read-only memory (ROM), a random access memory (RAM), a magnetic disk, or an optical disk. It is to be noted that, in this context, relational terms such as first and second are used merely to distinguish one entity or operation from another entity or operation, and do not necessarily require or imply that there is any such actual relationship or order between such entities or operations. Furthermore, the term "comprise" or "contain" or any other variations thereof is intended to encompass a non-exclusive inclusion, such that a process, method, article, or apparatus that comprises a plurality of elements includes not only those elements but also other elements not listed, or elements that are inherent to such a process, method, item, or apparatus. Without more restrictions, an element that is defined by the phrase "comprising a . . . " does not exclude the presence of additional equivalent elements in the process, method, item, or apparatus that comprises the element.

The foregoing descriptions merely show specific implementations of the present application, and the protection scope of the present application is not limited thereto. A person of ordinary skill in the art can readily conceive of variations or replacements within the technical scope disclosed by the present application, and these variations or replacements shall fall into the protection scope of the present application. Accordingly, the protection scope of the present application shall be subject to the protection scope defined by the claims.

INDUSTRIAL APPLICABILITY

By the technical solution of the present application, the authenticity of an object can be effectively identified, and the accuracy of the detection result can be improved by eliminating the effect of the change in the external ambient light and the spectral change of the light source in the system on the detection result.

What is claimed is:

1. A detection method, comprising steps of:
   acquiring reference imaging spectral data and imaging spectral data of a surface of an object to be detected;
   obtaining spectral reflectance of the surface of the object to be detected according to the reference imaging spectral data and the imaging spectral data of the surface of the object to be detected;
   matching the spectral reflectance of the object to be detected with spectral reflectance, stored in a calibration library, of an original object corresponding to the object to be detected;
   determining that the object to be detected is consistent with the original object if the matching of spectral reflectance is successful; and
   determining that the object to be detected is not consistent with the original object if the matching of spectral reflectance is failed.

2. The method according to claim 1, wherein, before the step of determining that the object to be detected is consistent with the original object if the matching of spectral reflectance is successful, the method further comprises steps of:

acquiring three-dimensional spatial morphology information of the object to be detected;

three-dimensionally reconstructing the object to be detected according to the three-dimensional spatial morphology information of the object to be detected, to obtain three-dimensional morphology data of the object to be detected; and matching the three-dimensional morphology data of the object to be detected with three-dimensional morphology data, stored in the calibration library, of the original object; and the step of determining that the object to be detected is consistent with the original object if the matching of spectral reflectance is successful comprises:

determining that the object to be detected is consistent with the original object if both the matching of spectral reflectance and the matching of three-dimensional morphology data are successful.

3. The method according to claim 2, wherein the step of acquiring three-dimensional spatial morphology information of the object to be detected comprises:

acquiring image information in the imaging spectral data of the surface of the object to be detected; and obtaining the three-dimensional spatial morphology information of the object to be detected according to the image information.

4. The method according to claim 2, wherein the step of acquiring three-dimensional spatial morphology information of the object to be detected comprises:

acquiring an image sequence obtained by capturing the object to be detected; and obtaining the three-dimensional spatial morphology information of the object to be detected according to the image sequence.

5. The method according to claim 2, wherein the step of determining that the object to be detected is not consistent with the original object if the matching of spectral reflectance is failed comprises:

determining that the object to be detected is not consistent with the original object if the matching of spectral reflectance or the matching of three-dimensional morphology data is failed.

6. The method according to claim 1, wherein the step of obtaining spectral reflectance of the surface of the object to be detected according to the reference imaging spectral data and the imaging spectral data of the surface of the object to be detected comprises:

obtaining first spectral energy data according to the reference imaging spectral data;

obtaining second spectral energy data according to the imaging spectral data of the surface of the object to be detected; and obtaining spectral reflectance of the object to be detected according to the first spectral energy data, the second spectral energy data and a reference reflectance.

7. The method according to claim 1, further comprising:

measuring similarity between the spectral reflectance of the object to be detected and the found spectral reflectance of the original object of the object to be detected, to obtain a reflectance similarity factor corresponding to each band;

weighted summing reflectance similarity factors of all bands to obtain similarity between the object to be detected and the original object;

determining that matching of the spectral reflectance of the object to be detected with the found spectral reflectance of the original object of the object to be detected is successful, if the obtained similarity is greater than or equal to a preset similarity threshold; and determining that matching of the spectral reflectance of the object to be detected with the found spectral reflectance of the original object of the object to be detected is failed, if the obtained similarity is less than the preset similarity threshold.

8. The method according to claim 2, further comprising:

acquiring coordinate points of the object to be detected and coordinate points of the original object of the object to be detected, within a preset region;

selecting, from the obtained coordinate points, coordinate points whose x-coordinate value and y-coordinate value are both the same, to form a plurality of pairs of coordinate points;

acquiring a difference between a z-coordinate value of a coordinate point of the object to be detected and a z-coordinate value of a coordinate point of the original object of the object to be detected, among each of the pairs of coordinate points;

calculating a multi-moment function value between all coordinate points and corresponding differences;

determining that matching of the three-dimensional morphology data of the object to be detected with the found three-dimensional morphology data of the original object of the object to be detected is successful, if the obtained multi-moment function value is less than a preset threshold; and determining that matching of the three-dimensional morphology data of the object to be detected with the found three-dimensional morphology data of the original object of the object to be detected is failed, if the obtained multi-moment function value is greater than or equal to the preset threshold.

9. The method according to claim 1, wherein both the reference imaging spectral data and the imaging spectral data of the surface of the object to be detected are obtained under same imaging light conditions.

10. The method according to claim 1, wherein the imaging spectral data is imaging hyper-spectral data.

11. A detection device, comprising:

a first acquisition module, configured to acquire reference imaging spectral data and imaging spectral data of a surface of an object to be detected;

a processing module, configured to obtain spectral reflectance of the surface of the object to be detected according to the reference imaging spectral data and the imaging spectral data of the surface of the object to be detected;

a first matching module, configured to match the spectral reflectance of the object to be detected with spectral reflectance, stored in a calibration library, of an original object corresponding to the object to be detected; and a determination module, configured to determine that the object to be detected is consistent with the original object if the matching of spectral reflectance is successful, and determine that the object to be detected is not consistent with the original object if the matching of spectral reflectance is failed.

12. The device according to claim 11, wherein the device further comprises:

a second acquisition module, configured to acquire three-dimensional spatial morphology information of the object to be detected;

a three-dimensional reconstruction module, configured to three-dimensionally reconstruct the object to be detected according to the three-dimensional spatial morphology information of the object to be detected, to obtain three-dimensional morphology data of the object to be detected;

a second matching module, configured to match the three-dimensional morphology data of the object to be detected with three-dimensional morphology data, stored in the calibration library, of the original object; and a determination module, specifically configured to determine that the object to be detected is consistent with the original object if both the matching of spectral reflectance and the matching of three-dimensional morphology data are successful, and determine that the object to be detected is not consistent with the original object if the matching of spectral reflectance or the matching of three-dimensional morphology data is failed.

13. The device according to claim 12, wherein the second acquisition module is configured to:

acquire image information in the imaging spectral data of the surface of the object to be detected; and obtain the three-dimensional spatial morphology information of the object to be detected according to the image information.

14. The device according to claim 12, wherein the second acquisition module is configured to:

acquire an image sequence obtained by capturing the object to be detected; and obtain the three-dimensional spatial morphology information of the object to be detected according to the image sequence.

15. The device according to claim 12, wherein the determination module is configured to determine that the object to be detected is not consistent with the original object if the matching of spectral reflectance or the matching of three-dimensional morphology data is failed.

16. The device according to claim 11, wherein the processing module comprises:

a first processing sub-module, configured to obtain first spectral energy data according to the reference imaging spectral data;

a second processing sub-module, configured to obtain second spectral energy data according to the imaging spectral data of the surface of the object to be detected; and a third processing sub-module, configured to obtain spectral reflectance of the object to be detected according to the first spectral energy data, the second spectral energy data and a reference reflectance.

17. A detection apparatus, comprising a memory and a processor, the memory stores a computer program that can be run on the processor, and the computer program, when executed by the processor, enables the processor to perform steps of the method according to claim 1.

* * * * *